US010911317B2

(12) United States Patent
Kazemian et al.

(10) Patent No.: US 10,911,317 B2
(45) Date of Patent: Feb. 2, 2021

(54) SYSTEMS AND METHODS FOR SCALABLE NETWORK MODELING

(71) Applicant: Forward Networks, Inc., Palo Alto, CA (US)

(72) Inventors: Peyman Kazemian, Redwood City, CA (US); Yasser Ganjisaffar, Sunnyvale, CA (US); Sivasankar Radhakrishnan, Santa Clara, CA (US); Nikhil Handigol, Milpitas, CA (US)

(73) Assignee: Forward Networks, Inc., Palo Alto, CA (US)

( * ) Notice: Subject to any disclaimer, the term of this patent is extended or adjusted under 35 U.S.C. 154(b) by 200 days.

(21) Appl. No.: 15/789,887

(22) Filed: Oct. 20, 2017

(65) Prior Publication Data

US 2018/0115466 A1 Apr. 26, 2018

Related U.S. Application Data

(60) Provisional application No. 62/411,364, filed on Oct. 21, 2016.

(51) Int. Cl.
*H04L 12/24* (2006.01)
*H04L 12/721* (2013.01)
(Continued)

(52) U.S. Cl.
CPC ........... *H04L 41/147* (2013.01); *H04L 41/14* (2013.01); *H04L 43/50* (2013.01); *H04L 45/124* (2013.01);
(Continued)

(58) Field of Classification Search
CPC ..... H04L 41/147; H04L 41/14; H04L 45/124; H04L 43/50; H04L 45/26; H04L 45/64;
(Continued)

(56) References Cited

U.S. PATENT DOCUMENTS

| | | | | |
|---|---|---|---|---|
| 5,546,390 A | * | 8/1996 | Stone | H04L 29/06 370/408 |
| 6,909,724 B1 | * | 6/2005 | Albert | H04L 45/00 370/352 |

(Continued)

OTHER PUBLICATIONS

International Search Report and Written Opinion issued in Application No. PCT/US17/57751 dated Jan. 18, 2018.

*Primary Examiner* — Jimmy H Tran
(74) *Attorney, Agent, or Firm* — Hogan Lovells US LLP

(57) ABSTRACT

Embodiments of the present invention can use a protocol-independent, vendor-independent, efficient and scalable abstraction model for representing the forwarding functionality of networks. Such a model can be used for systematic analysis and verification of networks. Packet header values may be represented as groups of one or more wildcarded bit strings, where unspecified header values are assumed to be fully wildcarded. This representation can describe many combinations of packets in a space-efficient way, enables more efficient tracing and transformation operations, and can even represent traffic from large internet routing tables efficiently. As a result of the scalability benefits of this more effective way to store and operate on packet collections, network modeling can scale to some of the largest, most complicated networks—those where the benefits are the greatest.

20 Claims, 8 Drawing Sheets

(51) Int. Cl.
*H04L 12/26* (2006.01)
*H04L 12/751* (2013.01)
*H04L 12/715* (2013.01)

(52) U.S. Cl.
CPC .............. *H04L 45/26* (2013.01); *H04L 41/12* (2013.01); *H04L 45/02* (2013.01); *H04L 45/64* (2013.01)

(58) Field of Classification Search
CPC ....... H04L 45/02; H04L 41/12; H04L 43/028; H04L 41/145
See application file for complete search history.

(56) References Cited

U.S. PATENT DOCUMENTS

| | | | | |
|---|---|---|---|---|
| 7,443,796 B1* | 10/2008 | Albert | ............... | H04L 29/06 370/235 |
| 8,898,734 B2* | 11/2014 | Singh | ................ | H04L 41/0866 726/3 |
| 8,954,601 B1* | 2/2015 | Patro | ............... | H04L 45/38 709/238 |
| 9,054,980 B2* | 6/2015 | Mattes | ................ | H04L 47/12 |
| 9,455,907 B1* | 9/2016 | Shumsky | ................ | H04L 45/74 |
| 9,461,939 B2* | 10/2016 | Wohlgemuth | .......... | H04L 45/74 |
| 9,602,398 B2* | 3/2017 | Pettit | ............... | H04L 45/38 |
| 9,667,528 B2* | 5/2017 | Banerjee | ................ | H04L 45/20 |
| 9,674,087 B2* | 6/2017 | Jackson | .............. | H04L 45/7453 |
| 9,680,748 B2* | 6/2017 | Jackson | .............. | H04L 45/748 |
| 9,686,185 B2* | 6/2017 | Shelly | ............... | H04L 45/38 |
| 9,813,336 B2* | 11/2017 | Levy | ................ | H04L 45/74 |
| 9,900,224 B2* | 2/2018 | Dumitriu | ............ | H04L 41/5038 |
| 9,929,915 B2* | 3/2018 | Erickson | ............... | H04L 41/145 |
| 10,033,638 B1* | 7/2018 | Stark | ................ | H04L 45/745 |
| 10,361,961 B2* | 7/2019 | Tsai | .................. | H03M 7/3059 |
| 2007/0157286 A1* | 7/2007 | Singh | ................. | H04L 41/0866 726/1 |
| 2014/0146674 A1* | 5/2014 | Wang | ..................... | H04L 45/38 370/235 |
| 2014/0153443 A1* | 6/2014 | Carter | ..................... | H04L 45/54 370/256 |
| 2014/0328350 A1* | 11/2014 | Hao | ........................ | H04L 47/80 370/401 |
| 2015/0092778 A1* | 4/2015 | Jackson | .............. | H04L 67/2842 370/392 |
| 2015/0103838 A1* | 4/2015 | Zhang | ..................... | H04L 45/38 370/401 |
| 2015/0131666 A1* | 5/2015 | Kang | .................... | H04L 45/745 370/392 |
| 2015/0186781 A1* | 7/2015 | Goyal | .................... | G06N 20/00 706/14 |
| 2015/0249587 A1* | 9/2015 | Kozat | .................... | H04L 45/28 370/222 |
| 2015/0281125 A1* | 10/2015 | Koponen | ............. | G06F 12/128 711/122 |
| 2016/0050148 A1* | 2/2016 | Xu | ........................ | H04L 49/35 370/235 |
| 2016/0197836 A1* | 7/2016 | Hussain | ................ | H04L 69/22 713/160 |
| 2017/0012848 A1* | 1/2017 | Zhao | .................... | H04L 41/5009 |
| 2017/0026276 A1* | 1/2017 | Dearien | ................ | H04L 41/12 |
| 2017/0180237 A1* | 6/2017 | Mulka | .................. | H04L 45/745 |
| 2017/0250869 A1* | 8/2017 | Voellmy | ................ | H04L 43/14 |
| 2017/0346716 A1* | 11/2017 | Zheng | .................... | H04L 45/38 |
| 2018/0375832 A1* | 12/2018 | Padmanabhan | ..... | H04L 63/0263 |
| 2019/0199623 A1* | 6/2019 | Zhang | ................... | H04L 47/2441 |

* cited by examiner

| | exact | wildcarded | |
|---|---|---|---|
| 302 | 00000000 | xxxxxxxx | 310 |
| 304 | 00000001 | | |
| 306 | 00000010 | | |
| | ... | | |
| 308 | 11111111 | | |

| | exact | wildcarded | |
|---|---|---|---|
| 322 | 1010 | 101x | 328 |
| 324 | 1011 | 1100 | 330 |
| 326 | 1100 | | |

| | 2-bit values | 3-bit values | |
|---|---|---|---|
| 342 | 01 | 001 | 346 |
| 344 | 10 | 010 | 348 |
| | | 100 | 350 |

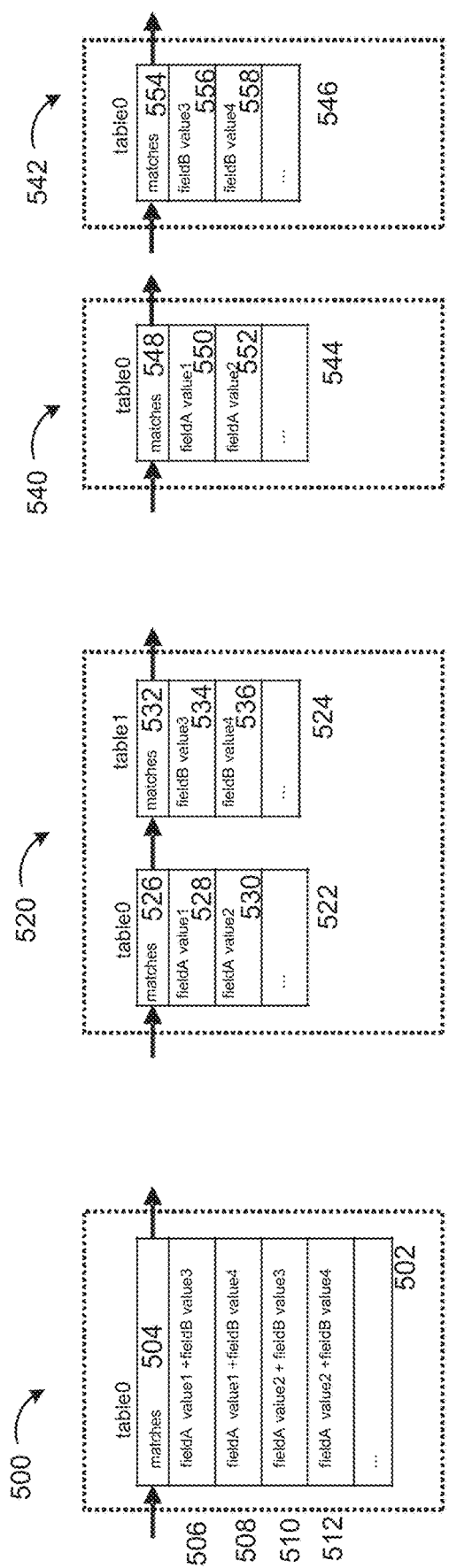

SYSTEMS AND METHODS FOR SCALABLE NETWORK MODELING

CROSS-REFERENCES TO RELATED APPLICATIONS

This application claims priority to U.S. Provisional Patent Application No. 62/411,364, filed Oct. 21, 2016, titled "SYSTEM AND METHOD FOR SCALABLE NETWORK MODELING," by Peyman Kazemian, et al., which is incorporated herein by reference in its entirety for all purposes.

BACKGROUND

Networks are growing more and more complex as the backbones of modern information technology systems. A large company may typically employ hundreds or thousands of devices and software components from different vendors to form its network infrastructure. Growth in complexity and size also brings more points of failure, such as forwarding loops, configuration mistakes, reachability issues, or hardware failures.

Diagnosing network failures is difficult for several reasons. First, the forwarding state associated with each network device that defines the overall network behavior is distributed throughout the network and is a result of emergent interactions between devices that are configured in vendor- and device-type-dependent ways. Second, the distributed forwarding states are difficult to monitor—often requiring the network administrator to manually login to the device and conduct low-level tests. Third, multiple administrators or users can edit the forwarding states at the same time, resulting in inconsistent configuration, followed by unexpected forwarding states.

Network models provide a software copy of a network's behavior, upon which a network administrator can better understand current behavior, troubleshoot problems, analyze whether a network is behaving according to policy, and even try out ways to improve performance and fault tolerance. However, the larger the network, the more difficult it can be to model, because not all models scale easily or accurately. Thus, techniques and methods of scaling network models are needed to aid in diagnosing problems in large, highly-complex networks, where the advantages of network modeling may be the most beneficial.

BRIEF DESCRIPTION OF THE DRAWINGS

Various embodiments or examples of the invention are disclosed in the following detailed description and the accompanying drawings:

FIGS. 3(A)-(C) illustrate example representations of encoding fields of packets using wildcards, in accordance with an embodiment of the present invention.

FIGS. 5(A)-(C) illustrate examples of rule tables that experience a cross-product problem, in accordance with an embodiment of the present invention.

DETAILED DESCRIPTION

Figure 1:
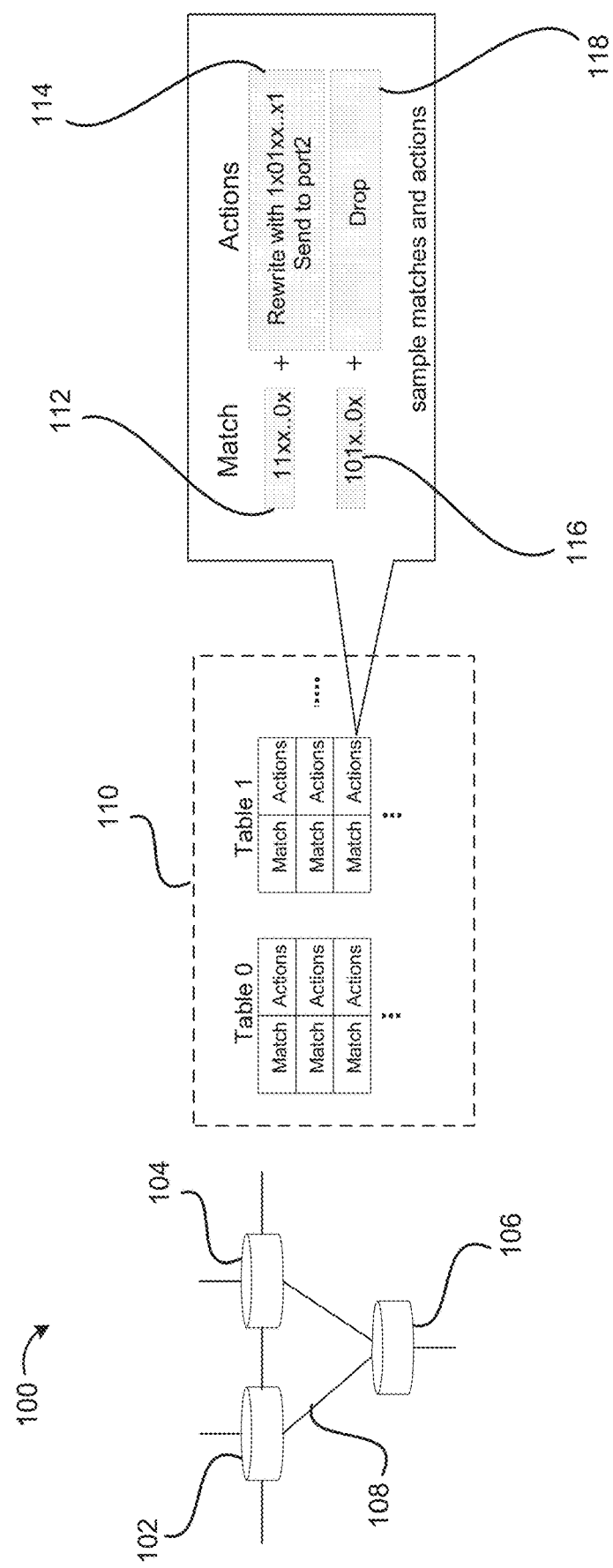
FIG. 1 is a high-level diagram illustrating a network of devices, in accordance with an embodiment of the present invention.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Within a network, data may be transmitted via packets from one networking device to another. Networking devices forward packets based on their header bits, and network behavior can be modeled using a plurality of different types of models. In one embodiment, a data-plane model may be implemented to model the network. In a data-plane model, the network behavior of the data being transmitted is represented by packets and their behavior through the network may be referred to as traffic, flow paths, traffic flow, etc. In some embodiments, state information (e.g., configuration data, forwarding states, IP tables, rules, network topology information, etc.) may be associated with a plurality of devices in a network. State information, network information, and/or any other relevant information about traffic on the network may be received from devices in a network, or obtained from another entity or network-data source. The state information may be parsed by a network modeling system and used to generate a network model, such as a data-plane model. Generally, network models describe how the network processes packets of data. Using the model, the network modeling system may be able to identify possible flow paths taken by packets of data through the network. The network modeling system may then use the information gathered from generating the network model to analyze the network and identify network behavior, such as types of traffic, frequency of rule matches, what kind of transformation occurs as traffic flows through the network, where the traffic gets dropped, etc.

In some embodiments, the network modeling system may generate two different types of models: a data-plane model or a control-plane model. The data plane, the control plane and the management plane are the three basic components of telecommunications architecture. The control plane and management plane serve the data plane, which bears the traffic that the network exists to carry. The data plane is the part of a network that carries user traffic. The data plane may also be referred to as the user plane, forwarding plane, carrier plane or bearer plane. The data plane enables data transfer to and from client computing devices, and may handle multiple data transmissions through multiple protocols. In conventional networking, all three planes may be typically implemented in the firmware of routers and switches. Software-defined networking (SDN) decouples the data and control planes and implements the control plane in software instead, which enables programmatic access to make network administration much more flexible. Data-plane models may be built by combining network state data with device-level forwarding behavior. For example, a data-plane model may consider forwarding lookups and output actions of individual devices and may interconnect the individual devices along known links based on the forwarding lookups and outputs.

In another embodiment, the network modeling system may generate a control-plane model. Control-plane models may be generated and built by combining network configuration data with protocol behavior. Network models may serve to represent the individual behavior of packets as they travel through the network. The overall network behavior may be represented by considering the individual behavior of individual network devices using one or more rule tables, in which the rule tables may dictate how the packets travel through the network devices on the network. For example, by dictating how the packets travel through the network via the network devices, network links or flow paths may be known. Then, the network may be modeled by interconnecting the network devices along the known network links, as shown in FIG. 1.

FIG. 1 is a high-level diagram illustrating a network 100 of networked devices 102, 104, and 106, in accordance with an embodiment of the present invention. The network 100 may include a plurality of networked devices 102, 104, and 106 that are linked by flow paths (e.g., 108). As an example, each networked device 106 may contain a set of rule tables 110, including Table 0 and Table 1. Each rule table in 110 consists of a sequence of rules, for example, transforming some fields in the packet, forwarding them to another table or device port, or dropping the packets. The sequence of rules includes match specifiers 112, 116 and specifies corresponding actions 114, 118 to be applied to the packets when the packets satisfy the match specifiers 112, 116, respectively. As an illustrative example, a packet or a group of packets arriving at network device 106 may be subject to Table 0 and Table 1 in 110, in which the packet may be compared to match specifier 112; in this example, to see if a packet header value matches "11xx . . . 0x". If match specifier 112 is satisfied, then the corresponding action 114 is executed on the packet. In this example, the packet header value may then be rewritten with "1x01xx . . . x1" and then sent to port 2. In another illustrative example, the packet may be compared to match specifier 116, and if the match specifier 116 is satisfied, then the corresponding action 118 is executed; in this example, the packet may be dropped.

According to various embodiments, the network modeling system may generate two different types of models: a data-plane model or a control-plane model. In a control-plane model, the data-plane rules may be inferred from control-plane configuration and behavior, while in a data-plane model, they may be based on state information that may be collected directly from the devices, obtained from other sources, or obtained from other means. In general, a network model may be built using any combination of control-plane configuration and data-plane state. A network modeling system generates a network model in software to enable a network administrator to trace one or more packets through the network for training, debugging, and analysis purposes. Tracing an individual packet and computing its behavior through the network can be relatively straightforward: existing network analysis systems can identify a packet, match the packet against rules in the first rule table, apply any resulting actions, follow links to other rule tables or other devices, continue tracing through them, and stop when the packet exits the network or is dropped. However, building a complete behavioral model of the network to cover every possible packet and flow path becomes infeasible for large networks. The number of distinct potential packets and paths in a large network leads to long computation times and exorbitant computing resources. Despite the challenges of modeling large or entire networks, modeling the entire network behavior is desirable for several reasons; for example, detecting errors like loops without identifying the packets that might trigger the errors in advance, and providing information about reachability (e.g., finding all packets that that can reach a host in the network). Even tracing a restricted subset of packets, such as all IPv4 packets, can be computationally infeasible when the set of packets to be traced is large.

A user or network administrator may consult the network model to discover what specific action has happened to a packet and where that action occurred within the network. For example, the user or network administrator may use the network model to determine where a packet is dropped within a network, or to verify that multiple paths are available between two hosts. In some instances, several packets (e.g., group of packets) that have entered a network or have arrived at a specific device in the network are subsequently forwarded to travel through the same flow path. Directing and forwarding the group of packets individually (e.g., directing and forwarding each individual packet one by one) would make behavior analysis infeasible in any large network. Not only would processing each packet individually be slow and tedious, it would be an inefficient and wasteful use of processing resources. As such, to help make a complete analysis of an entire and/or large network model computationally feasible, when the group of packets enter the network or arrive at a specific device in the network and are forwarded in the same way, the network model may group the packets together into a collection of packets. The network model may determine that the group of packets is to be collectively forwarded in the same manner (e.g., flow path), and continue to process and refer to them as a collection of packets. For example, complex mathematical operations may be applied in each rule table using collections of packets, including matching a packet collection against rule table rules, finding the intersection between a collection of packets and the matching packets of a rule, finding the remaining collection of packets which has not matched a rule, applying actions that transform the collection of packets, and finding the intersection between two collections of packets. All of these operations may be performed on the packet collection as a whole, rather than for each individual potential packet.

Embodiments of the present invention provide novel techniques of representing a collection of packets that result in an improved model implementation that can be scaled to larger and more complex networks than existing techniques. Determining how to represent a collection of packets (i.e., packet collection) can significantly affect the resulting network model analysis; for example, the representation can affect which mathematical operations to execute, and representation can vary in implementation complexity, memory requirements, and execution efficiency. The network model according to various embodiments provides a means of constructing and analyzing a network model in a reasonable amount of time by adopting an improved packet representation for grouping packets and collections of packets, and performing mathematical operations using the improved representation.

Figure 2:
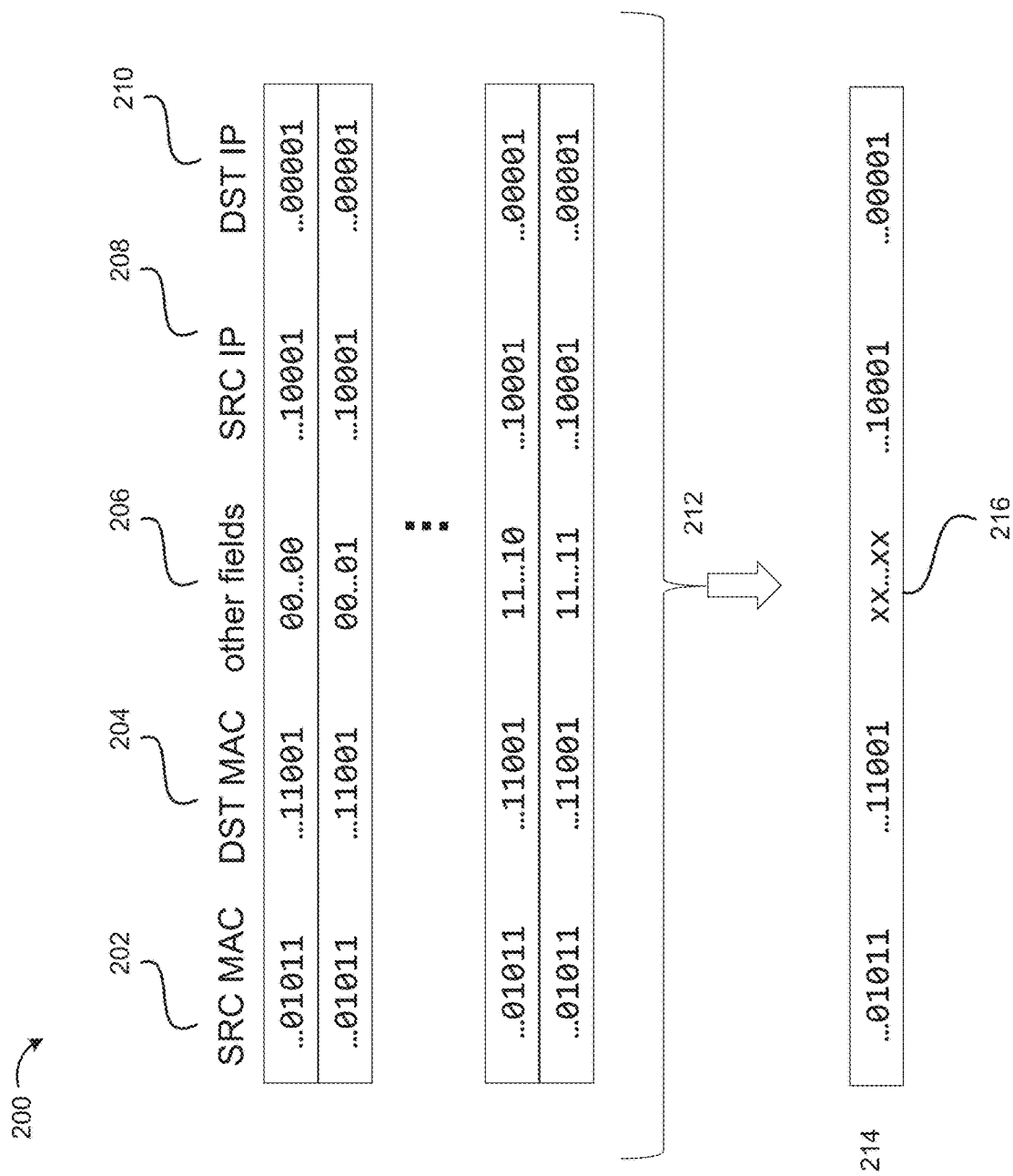
FIG. 2 illustrates example representations of encoding a collection of packets, in accordance with an embodiment of the present invention.

FIG. 2 illustrates an example 200 of encoding a collection of packets, in accordance with an embodiment of the present invention. There are multiple ways in which to represent packets such that their behavior within a network can be observed and analyzed. A collection of packets 212 may be routed between an origin and a destination on a network. The packets then travel around the network, locally or globally, wired or wirelessly, and may then be unbundled by another node on the network. During network troubleshooting, administrators and engineers analyzing the networks may need to use a protocol analyzer to open up or look into the packets and to observe their contents. Each packet in the collection 212 includes various fields 202, 204, 206, 208, and 210 that may hold content that can provide important insight to the network administrator as to the packet's behavior on the network. For example, a source MAC address 202 (SRC MAC), a destination MAC address 204 (DST MAC), a source IP address 208 (SRC IP), a destination IP address 210 (DST IP), and other fields 206. As shown in FIG. 2, the packets in the collection 212 differ in their packet header values for field 206, such that the values can be combined using wildcard bits. As shown in FIG. 2, the virtual packet header 214 illustrates a representation of encoding the collection of packets 212 where the 'x' bit may operate as a wildcard bit such that the 'x' bit can represent both 0 and 1 simultaneously, as shown in the field 216.

FIGS. 3(A)-(C) illustrate example representations of encoding a collection of packet fields using wildcards, in accordance with an embodiment of the present invention. As shown in FIG. 3(A), contiguous power-of-two regions may be represented by a single wildcarded range. A collection of packets may be represented by including wildcarded bit strings in the fields of headers, such that an entire header field can take any value when an 'x' is in all bit positions in the header field. In some embodiments, packet header values may be unspecified, unknown, empty, or irrelevant, and thus, may be implicitly assumed to be fully wildcarded, unless there is a restricted value for that particular packet header field. Representation 300 includes using wildcard bits for header fields that have a contiguous power-of-2-aligned range. For example, an IPv4 subnet like 1.2.3.0/24 can be represented with a single wildcarded bit string that ends in 8 x bits, to represent the 256 possible IP addresses in that subnet, since the value starts at a power of 2 (0) and ends exactly one value before a power of 2 (255). As such, a packet may then be modeled as a point in the $\{0, 1\}L$ space, where L is the length of the header. To illustrate, in representation 300, a fully wildcarded header 310 of all 'x' bits can represent packet header 302 having the value '00000000', packet header 304 having the value '00000001', packet header 306 having the value '000000010', and all values up to packet header 308 having the values '11111111'.

FIG. 3(B) illustrates another example representation 320 of a collection of header field values. Wildcard bits can represent a collection of packets that differ in one or more particular bit positions, but share common values elsewhere. Two bit strings that differ in exactly one bit position can be combined into one bit string by wildcarding the differing bit; for example, the values "0000" and "0010" can be represented as "00x0", where the 'x' bit indicates that the corresponding bit is wildcarded and indicates both 0 and 1. This procedure can be performed repeatedly to combine values represented as wildcarded bit strings. When two points are adjacent in this L-dimensional space, they can be represented by a compact representation using wildcards. For example, "0000" and "0010" in a 4-dimensional space are adjacent together and these two points can be represented as "00x0" where the 'x' bit indicates that the corresponding bit is wildcarded and indicates both 0 and 1. To illustrate, in representation 320, consider the range of TCP ports with values from 10 to 12 referenced in packet header 322 having the value '1010', packet header 324 having the value '1011', and packet header 326 having the value '1100', respectively. These three values in 322, 324, and 326 can be represented by two wildcarded bit strings 328 and 330, having the values 101x and 1100 respectively, where the preceding 12 bits of the 16-bit TCP port field are all 0's in both bit strings.

However, wildcarding may provide no benefit for representing some packet collections. FIG. 3(C) illustrates examples that cannot be represented in fewer values using wildcards. Representation 340 considers two two-bit strings 342 and 344, having the values 01 and 10, respectively. No single wildcarded bit string can represent these two values; two bit strings are required. Representation 340 also considers three three-bit strings 346, 348, and 350, having the values 001, 010, and 100, respectively. None of them can be combined and three bit strings are required to represent all the values.

In existing network analysis techniques, wildcarding helps to reduce the number of bit strings needed to represent a packet collection. However, reduction all the way down to a single wildcarded bit string is rare, as individual field values, such as for IP address ranges, Ethernet types, and TCP ports, are often not combinable as illustrated in the representations of FIG. 3(C). Hence, packet collections typically contain a list of multiple bit strings. When packet collections cannot be represented in a more compact way and require many bit strings, tracing them through the network can result in a large number of expensive mathematical operations. Accordingly, the groups of packets may be limited to only those whose headers represent a contiguous region. If representing a group of packets by a single wildcarded bit string is not possible, then the network model is required to use a list of multiple bit strings to describe the packets individually instead of collectively as a group. The individual representation of each packet within a group of packets consumes more storage because it results in a much longer bit string representation. As a result, network models and analysis that refer to individual packets within a group of packets can be difficult to scale without unlimited memory and processing resources.

Furthermore, in networking, tracing packets through the network involves accessing rule tables that define the traffic flow of packets traveling within a network. Rule tables contain a number of rules where each individual rule may be represented as a condition that defines how packets should be directed; for example, if a packet satisfies a condition, that packet will be directed to a particular flow path defined for that condition. However, tracing using rule tables can be inefficient, particularly when the rule tables represent access control list (ACL) entries, such as those found in a firewall or router. If a large number of individual packet header field values are the result of tracing packets through device A, and then in device B, the packets are treated based on different fields. As a result, the number of potential packet values to trace can increase rapidly, consuming extra memory and unwanted computation time.

Figure 4:
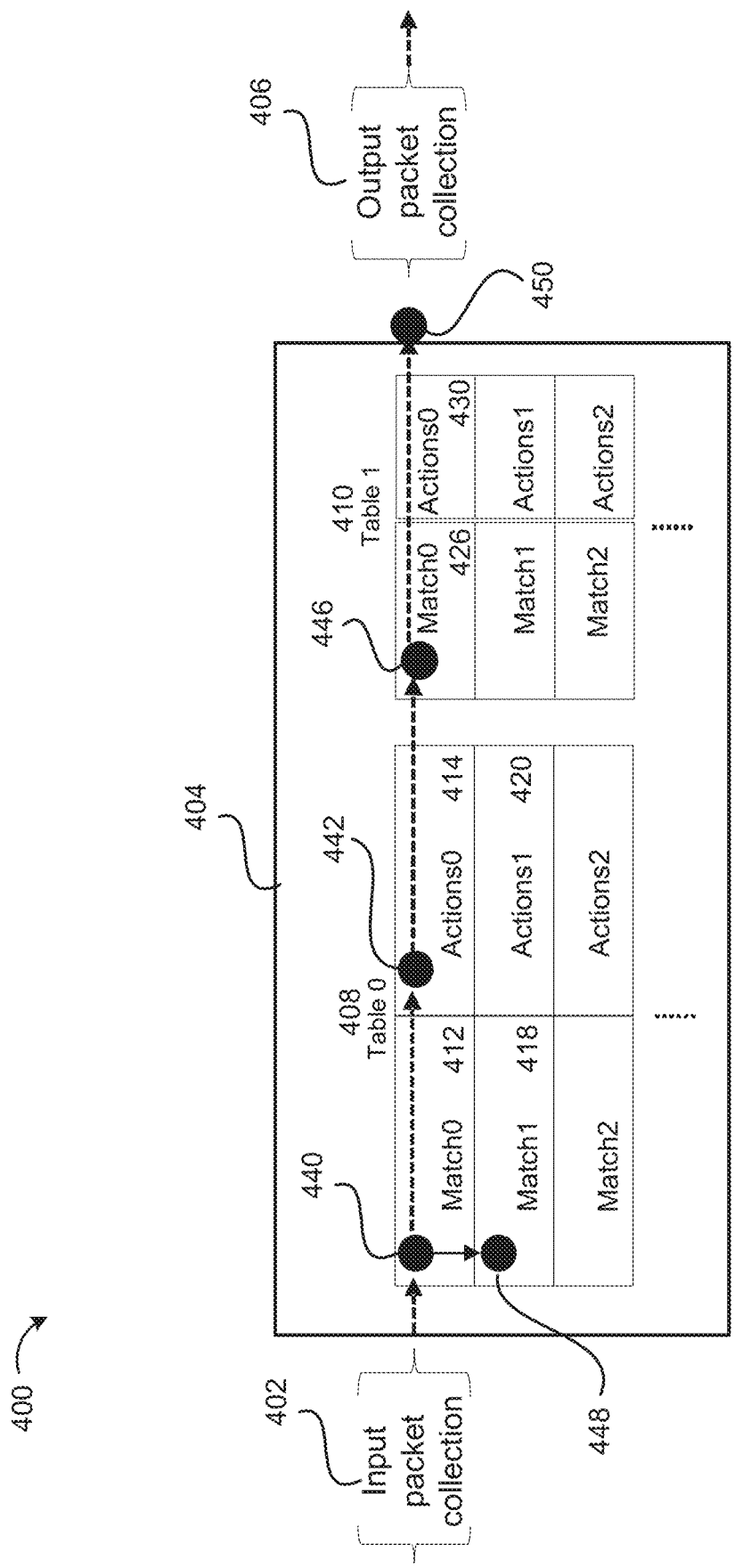
FIG. 4 illustrates an example of tracing a packet collection through a rule table, in accordance with an embodiment of the present invention.

FIG. 4 illustrates an example of a packet collection entering a rule table, in accordance with an embodiment of the present invention. In example 400, an input packet collection 402 may enter a device 404 in a network model, the device including rule table 408 "Table 0" and rule table 410 "Table 1." To find out if the first rule "Match0" 412 in rule table 408 "Table 0" matches the packet collection, a mathematical operation, such as an intersection operation, must be performed, as shown at point 440. This operation for "Match 0" 412 may be executed not simply to determine whether there is any overlap, and hence a match, but also to determine the exact overlap. The exact overlap may be used later when applying "Actions0" 414 at point 442, which may potentially modify the packet collection. Subsequently, tracing can continue (1) in the next rule table 410 "Table 1" with a potentially-modified packet collection in point 446, as well as (2) at the next rule (e.g., "Match1" 418 and "Actions1" 420) in the table 408 "Table 0" with the non-overlapping portion of the packet collection, shown at point 448. At point 446, when "Match0" 426 is satisfied and "Actions0 430" is taken, then the output packet collection 406 may exit the device 404, as shown at point 450. As packet collections contain more bit strings, the number of computation cycles to complete the intersection operation increases, such that it can easily dominate the overall computation time. In addition, applying actions, like rewriting header fields at point 442, can become expensive with more bit strings.

These problems with scaling packet tracing on network models become particularly noticeable when representing a collection of packets denoted by a cross-product of values across header fields. Called the "Cross-Product Problem", this problem occurs when representing a collection of packets that includes the entire Cartesian product of values across two or more header fields. Enumerating the combinations of header values results in a large number of wildcarded bit strings to represent all the packets in the collection, which adds computation cost to each intersection and rewrite operation. If the cross-product problem is not addressed through careful packet collection representation and efficient mathematical operations on the collection, the network model may not scale to a practically large size. Either the tracing process will take too long, or may require too many resources, to be useful.

Figure 6A:
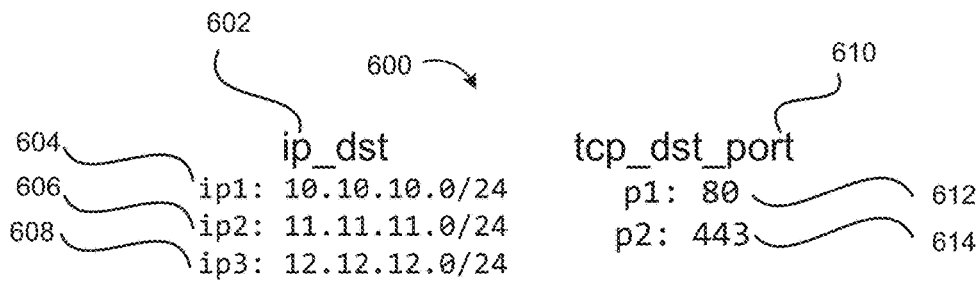
FIGS. 6(A)-(C) illustrate examples of IP addresses corresponding to the network model, in accordance with an embodiment of the present invention.
Figure 6B:
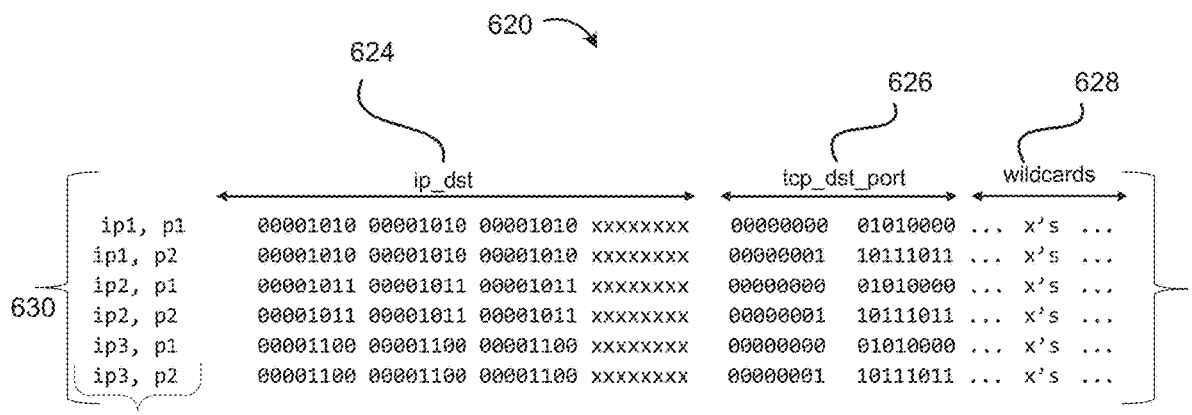
Figure 6C:
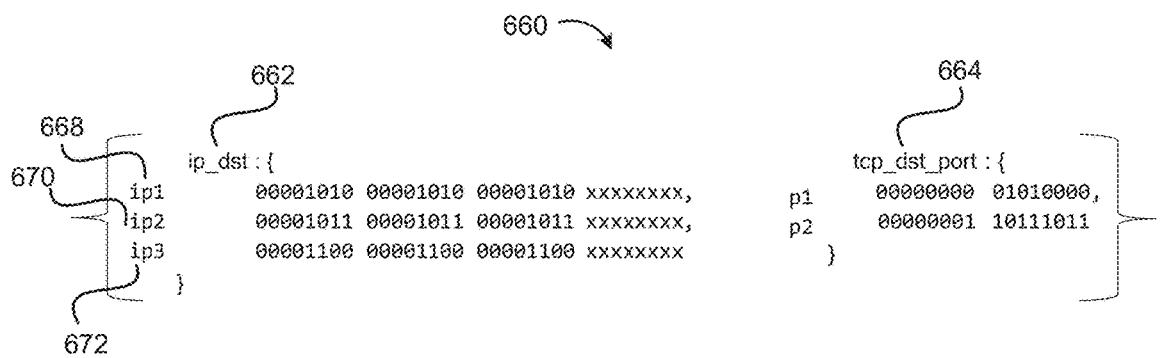

FIGS. 5(A)-(C) illustrate examples of computing a network model, in accordance with an embodiment of the present invention. FIGS. 6(A)-(C) illustrate examples of a collection of packets denoted by a cross-product of IP destination and TCP destination port header fields, in accordance with an embodiment of the present invention. For example, the cross-product problem can be illustrated in at least three scenarios while computing a network model: (1) inside a single table in FIG. 5(A); (2) across rule tables in a single device in FIG. 5(B); and (3) across independent rule tables in different devices in FIG. 5(C).

In FIG. 5(A), the cross-product problem may be seen within a single rule table 502 in network device 500, where individual rules 506, 508, 510, and 512 may be relevant for forwarding a packet. In an example, in corresponding FIG. 6(A), a firewall rule table may match (e.g., 502 in FIG. 5(A)) on two fields, IP destination address 602 "ip_dst" and TCP destination port 610 "tcp_dst_port." The IP destination address 602 field may include IP addresses 604, 606, and 608, and the TCP destination port 610 field may include ports 612 and 614. The three IP destination subnets (e.g., 604, 606, and 608) and two TCP destination port values (e.g., 612, 614) are not combinable using the wildcarded bit string representation. As a result, the set of packets that the rule matches may be represented as six different bit strings to cover each possible combination of IP destination subnet and TCP destination port value, as shown in FIG. 6(B). In FIG. 6(B), each bit string in 630 may include a pair 622 of an IP address and a TCP port, an IP destination address 624 "ip_dst," a TCP destination port 626 "tcp_dst_port", and additional wildcarded fields 628. Subsequently, each of these six-bit strings 630 produces a different bit string as a result of a tracing operation. Each of these bit strings may yield even more unique bit strings in the next rule table within the same device, or when the traffic is traced through another device.

FIG. 5(B) illustrates when the cross-product problem manifests across different rule tables 522 and 524 in a single device 520, when the rules in rule tables match on different header fields. Rule table 522 "table0" may include rules matching field values 528 and 530, while rule table 524 "table1" may include rules matching field values 534 and 536. For example, an Access Control List (ACL) table might contain rules that match on the TCP destination port and permit the traffic, while an IP routing table matches on the IP destination address to forward traffic to an output port. Similar to the previous example illustrated in FIG. 6(A), if there are three IP destination subnets and two TCP destination ports, when a collection of packets is traced through the pipeline of tables 522 and 524 in the device 520 and the match criteria are applied at each rule, the analysis results in 6 different wildcard-bit strings to represent all the packets that may come out of the device, as shown in FIG. 6(B). As with the example shown in FIG. 5(A), tracing through the rule tables yields a significant increase in the number of bit strings, which continues with later devices in the path.

Similarly, as shown in FIG. 5(C), the cross-product problem also manifests across devices 540 and 542, when a network contains rules that match on different header fields. For example, device 540 might contain rule table 544 with two rules 550 and 552, where the action is to set the output port based on the IP destination address. Another device 542 may contain a firewall rule table 546 with two rules 556 and 558, where the action is to block some traffic based on TCP destination ports. When each packet collection traced through device 540 reaches device 542, the end result is a cross-product of all the rules. As with examples FIG. 5(A) and FIG. 5(B), tracing through the rule tables yields a significant increase in the number of bit strings, which continues with later devices in the path. Regardless of the number of devices or tables involved in a cross-product, the resulting problem is the same.

To illustrate the Cross-Product Problem, consider the following header field value lists:
my-ip-list=[1.2.3.0/24 10.20.30.0/24 100.200.300.0/24 . . . ] (m elements where m=1, 2, . . . , M)
my-allowed_ports=[80 443 22 8443 . . . ] (n elements where n=1, 2, . . . , N)

These lists may be used to create an ACL rule, such as this one:
match=
ip_src: my-ip-list;
ip_dst: my-ip-list;
ip_proto=TCP/UDP;
tp_dst_port=my-allowed_ports;
tp_src_port=my-allowed_ports;

action=
allow

The ACL rule above defines the traffic flow of the packet with a match and a corresponding action, such that if the packet matches the parameters defined by the match (e.g., ip_src, ip_dst, ip_proto, tp_dst_port, tp_src_port), then the corresponding action is to allow the packet to pass. M elements may be present to match each IP field and n elements may be present to match each port. This configuration requires $m^2 n^2$ unique bit strings to represent packets that match the ACL rule, which for larger m and n, can be an immense number of unique bit-string rules. Furthermore, if each rule is considered independently, then any later processing stages will see a much larger number of bit strings, resulting in extra CPU, memory, and disk usage.

In another example, the situation when packet regions are continuous, representing groups of IP prefixes can also be challenging. As illustrated below, the IP table includes 3 distinct next-hop addresses, A, B, and C:

10.0.0.0/8→A
11.0.0.0/8→B
12.0.0.0/8→C
14.0.0.0/8→A
15.0.0.0/8→B
16.0.0.0/8→C

This configuration may include six unique bit rules to represent the configured behavior, since each group of rules with the same next-hop is non-contiguous. However, a network model according to embodiments of the present application may represent the IP table as three groups, such that additional work in later processing stages may be reduced to a minimum.

Various applications may benefit from the advantages of various embodiments of the present invention. For example, data-plane modeling according to various embodiments may be used to verify that the software code enables the network to function properly. Alternatively, in a production environment, data may be used to validate the current behavior of the network or test the effect of proposed changes.

According to various embodiments, the network modeling system may use a protocol-independent, vendor-independent, efficient and scalable abstraction model for representing the forwarding functionality of networks. Such a model may be used for systematic analysis and verification of networks. The network model may include forwarding rules that are used to determine how packets are processed by devices in the network. In some embodiments, the network model may be periodically updated. In some embodiments, instead of recomputing the entire network model each time the actual network's state changes, the network model may be incrementally updated by only updating the associated changed forwarding states, which can be realized through rule dependency tracking. In rule dependency tracking, an individual update to a state table, such as a VLAN change at an input port, automatically causes rules that match that input port to update, without requiring the re-generation of other unrelated rules. The list of updated rules may then be used to update the modeling of affected traffic classes and paths in the network, leaving the rest of the model unaffected.

According to an embodiment, the network modeling system may address the Cross-Product Problem by implementing an efficient representation for a collection of packets, where each individual header field is represented as a collection of wildcarded bit string values that are possible for that field. The packets included in the collection are packets with header values limited to values specified for the respective header fields in the representation. The wildcarded bit strings for each field are only as wide as the length of that field. For example, for the collection of packets defined in FIG. 6(A), the packet collection may be represented by a single entry containing all the IP destination values 602 and another entry containing all the TCP destination ports 610. Mathematical operations may then be performed on the entire packet collection rather than on individual wildcarded bit strings. While performing these operations, many of them do not require enumerating the cross product to compute the long wildcarded bit strings that cover all the header fields in the packet. The operations may operate directly on the overall packet collection representation or on the set of values for a particular header field. As a result, the network modeling system according to various embodiments may be benefited by significant improvements in CPU, memory, disk usage costs.

In an embodiment, as shown in FIG. 6(C), the network modeling system may represent packet header values as groups, for example the representation 660 may include IP destination 662 "ip_dst" to group IP addresses 668, 670 and 672, and TCP destination ports 664 to group ports p1 and p2. Not shown on the diagram, unspecified header values may be assumed to be implicitly wildcarded, with no storage used to represent them. In this way according to various embodiments, a single description can represent many combinations of packets, leading to a network model with improved efficiency and scalability. This representation may then avoid problems with bit-string representations, such as the cross-product rule problem, as well as the inability to represent traffic from large internet routing tables efficiently. The representation 660 may also be more space-efficient when several header fields are fully wildcarded, both because fewer bit strings are needed, and because bit strings for a particular header field can be stored once and not repeated for each possible combination (cross product) with bit string values of other header fields.

In some embodiments, fields used in the packet collection representation may not correspond to well-known header fields typically used for packet forwarding. For example, a custom tag may be added within a network to denote an ingress point or a class of traffic. This custom tag may be included in the packet collection. The network model may also introduce its own set of virtual fields to denote some classification of packets that is relevant to the model.

Although there may be challenges associated with representing packet collections with wildcards, embodiments of the present invention overcome these challenges and provide additional advantages. For example, mathematical operations may be performed on the packet collection, such as analyzing which packets match a rule, or combining two packet collections. According to various embodiments, when these mathematical operations are executed, the resulting output may be represented in a form that satisfies the property that all cross-products of values across the header fields should be included in the result. Alternately, the representation may be able to indicate which packets are excluded from the cross-product. In another example, a network modeling system according to various embodiments may correctly implement each operation, including combination and rewrite operations, despite the large number of ways in which collections of header values may intersect or combine.

According to various embodiments, the packet collection representation may be implemented in Java, C++, C #, or any suitable programming language, on any computing hardware, such as a general-purpose processor or graphics processor. In some embodiments, the invention may be implemented directly in hardware, via field-programmable gate array or application-specific integrated circuit.

Figure 7:
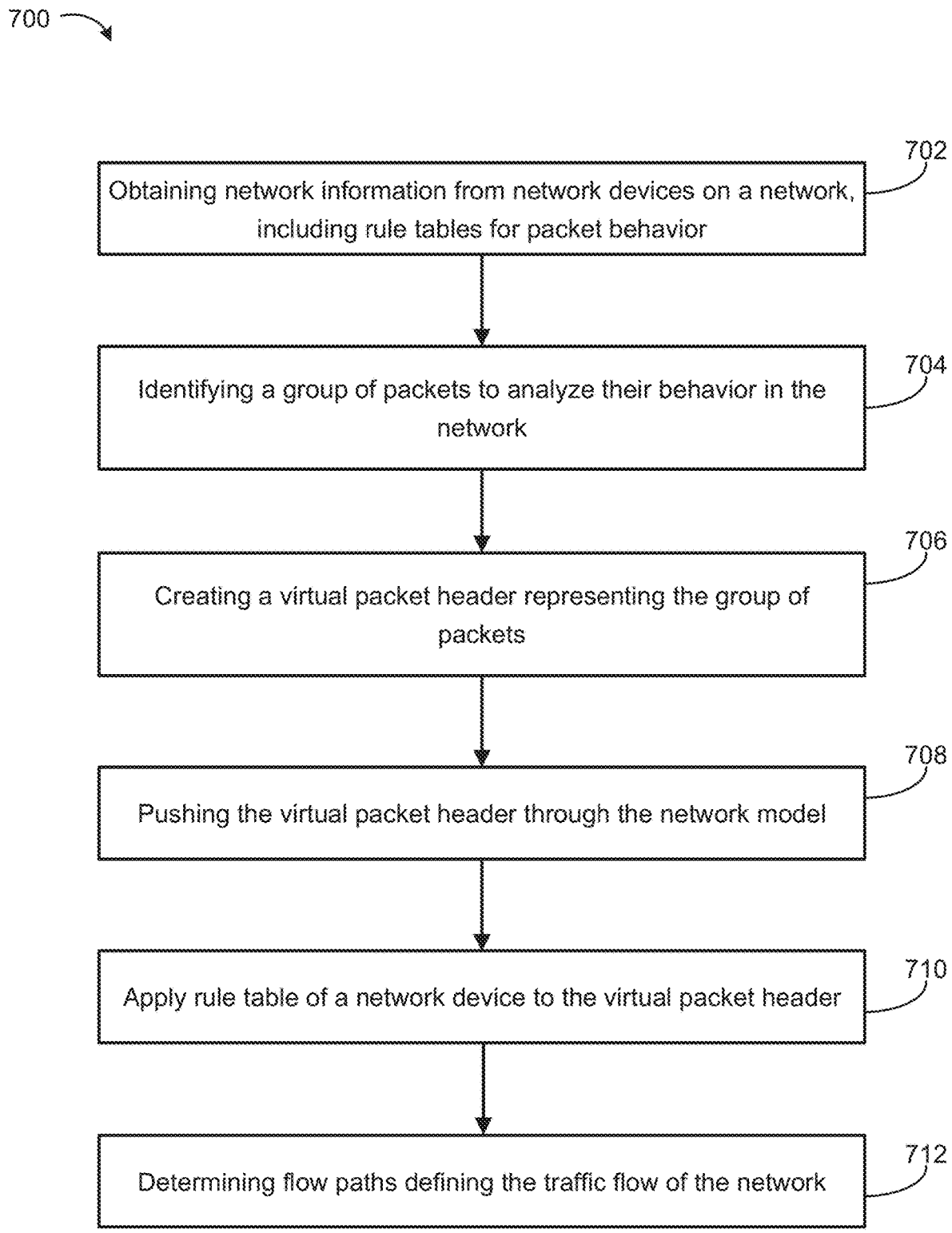
FIG. 7 is a high-level flow diagram illustrating an example method of analyzing networks, in accordance with an embodiment of the present invention.

FIG. 7 is a block flow diagram illustrating an example method 700 of processing and analyzing packets in a network modeling system according to various embodiments. A networking device, according to various embodiments, may be modeled as a collection of rule tables where each rule table includes a list of rules and each rule includes a match and a collection of actions, such as the rule tables shown in FIG. 1. At step 702, the network modeling system may obtain network information associated with network devices on a network such as the network shown in FIG. 1. The network information may be obtained from a third party entity or collected from the network devices in the network. As shown in FIG. 1, each network device may include one or more rule tables that describe forwarding behavior for packets within the network. Each rule table may include a set of rules, where the rules may be applied in a specific order or in any order (e.g., unordered). In some embodiments, the rules may be implicit or explicit. Each rule is comprised of a match specifier and corresponding actions, such that when a packet or group of packets matches the match specifier, the rule is applied to the packet and the corresponding actions are performed. The forwarding behavior defined in the rule tables of each device in the network may, collectively, cause and define the traffic flow of the network.

At 704, the network modeling system may identify a group of packets to analyze in a network model. In one embodiment, the group of packets may be identified as entering the network or arriving at a network at particular devices or ports. Identifying the group of packets may be based at least in part on the network information obtained, where the network information includes at least the one or more rule tables and network topology. In some embodiments, the group of packets may be identified based on information obtained about troubleshooting a collection a packets in the network analysis system.

At 706, the network modeling system may then create a virtual packet header to represent the group or collection of packets identified. The virtual packet header, in order to represent the collection of packets, may include wildcarded bits according to various embodiments. The virtual packet header may include one or more packet header groups, where at least one of the one or more packet header groups represents a union of two or more packet header values.

The virtual packet header may then be pushed through a network model to simulate network behavior, at 708. When the virtual packet header is pushed through the network, it may enter a network device, for example as shown in FIG. 1. As the virtual packet header enters the network device, the rule tables of the network device may be applied to the virtual packet header. A rule match determines the collection of packets for which this rule applies and may be represented as an HRegion. At 710, a rule match occurs by comparing values in the collection of packets with the values specified in the match specifier. If a collection of packets belongs to this region and matches this rule, then the corresponding actions specified in that rule are applied to that collection of packets. Within a rule table, rules (e.g., match and corresponding action) may be processed in a particular order or in any order. The rules may be explicit in the rule table or implicit. The corresponding actions of rules may be explicit or implicit and include transformations, which can be any operation performed on the virtual packet header that changes at least one packet header value. In some embodiments, the rule tables may be implicit. At 712, the network modeling system may then determine the flow paths of packets traveling in the network based on the behavior of the virtual packet header through the network model.

In one embodiment, the network modeling system may model packet collections by using a virtual packet header to represent the collection. A virtual packet header specifies the union of header fields over defined protocols. For example, this virtual packet header may include fields that are present in the headers of both IPv4 and IPv6 packets. When representing an IPv4 packet, a virtual packet header may wildcard all bits that are related to other protocols like IPv6. Each field in the virtual packet header has a corresponding unique identifier, called a field ID. Accordingly, the virtual packet header may identify the packet or class of packets by using wildcards as the packet header values. By doing so, the virtual packet header may have an overall bit size that is smaller than the sum of each individual packet header in the group of packets represented by the virtual packet header, if each had to be processed individually.

For any given packet, many fields may be fully wildcarded. Instead of representing packet collections using sequences of {0, 1, x} bits, the network modeling system according to various embodiments may use a sparse representation consisting of a collection of field IDs and their corresponding values. Fields not present in this collection may be assumed to be fully wildcarded (i.e., all bits are represented with 'x' values). The value of each field is a collection of possibly-wildcarded values. For example, the virtual packet header may include three fields: f1, f2, and f3, and each of these fields may include four bits. In this example, the example packet collection may be represented using the following compact representation:

(f1, {"0000"}), (f3, {"0001", "00x0"})}

The compact representation above is equivalent to:

{"0000,xxxx,0001", "0000,xxxx,00x0"}

The first value above ("0000,xxxx,0001") includes four wildcarded bits and hence represents 16 distinct values. Similarly, the second value ("0000,xxxx,00x0") includes 5 wildcarded bits and hence represents 32 distinct values. As a result, the compact representation represents 48 packets in this example.

Embodiments of the present invention may use header bits ("HBit") to refer to bits that can have one of three values in {0, 1, x}. A sequence of these Hbits may be referred to as a header sequence ("HSeq"). For example, "00x0" in the above example is an HSeq. The value of a header field may be represented as a set of HSeqs which may be referred to as a header sequence collection ("HSeqCollection"), e.g., "{"0001", "00x0"}". A collection of header fields and their corresponding values, as in the above example, may represent a non-contiguous region. Embodiments may use a header region ("HRegion") to refer to such regions, for example: "{(f1, {"0000"}), (f3, {"0001", "00x0"})}". In this notation, an Hregion is a map from packet fields to HSeqCollections. If a packet field is fully wildcarded in an Hregion, it will not have an entry in the corresponding map. In other words, the absence of an entry for a packet field in this map indicates that the field is fully wildcarded.

A collection of packets may be represented, in an embodiment, by input_region (an HRegion) when the collection of packets enters a network device with a rule table, for example, as shown in FIG. 4. The rule table may contain a set of rules, such as [r1, r2, r3], and each rule may have a respective match, such as [match1, match2, match3]. In order to find the fraction of the input_region that matches r1, the network modeling system according to various embodiments may determine the intersection of input_region and match1. The intersection of HRegions is described in greater detail further in the present application. The collection of packets that are in input_region but do not match1 may then be carried forward to the next rule(s).

To represent packet collections like those carried forward to next rules, which may not be modelable as a single HRegion, according to various embodiments the network modeling system may define a header expression ("HExpr"). HExpr may represent an HRegion minus the union of a collection of other HRegions. In other words, the HExpr represents the difference between a "first packet collection" and one or more "other packet collections". To illustrate, in the above example, 'input_region-{match1}' (referred to as "hse1") may be the HExpr representing the collection of packets that are sent to r2 for processing. In order to find which packets in this collection need to be processed with r2, the networking modeling system may determine the intersection of packets represented by hse1 and the packets represented by match2, which is an HRegion. The intersection of an HExpr and an HRegion is an operation that may be invoked when tracing a group of packets that can enter each rule in a rule table. Similarly, 'input_region-{match1, match2} (referred to as "hse2") may be the HExpr representing the collection of packets that can match rule r3. In hse2, 'input_region' according to various embodiments may be referred to as a minuend, and 'match1' and 'match2' may be referred to as subtrahends. The intersection of an HExpr and an HRegion is described in greater detail further in the present application.

In one embodiment, the networking modeling system may perform transformation operations on packet collections. Before a transformation operation, a packet collection (i.e., represented by an HExpr) may match a rule in one of the rule tables of a device on the network, as in the example shown in FIG. 4. Subsequently, the actions specified in that rule may be applied to that packet collection (i.e., a transformation action). These actions may transform the input HExpr to an output HExpr. In addition to HExpr transformations, the actions in the rule table can specify how packet collections are forwarded to device ports or dropped. For example, when a device has the same behavior for all packets in a packet collection arriving at specific ports, the behavior of the device may be modeled using the following format:

(inputHExpr, inputPorts)→(outputHExpr, outputPorts)

The above representation may indicate that when the collection of packets represented by 'inputHExpr' arrives at any of the ports indicated by 'inputPorts', it is transformed to 'outputHExp' and forwarded to 'outputPorts'. HExpr transformations can be expressed using rewrite and move actions.

One example of an HExpr transformation action is a rewrite action, which rewrites the value of a single field in an HExpr to another value. To illustrate, there may be the following HExpr:

{(f1, {"0000"}), (f3, {"0001", "00x0"})}

This HExpr may be rewritten such that "f1" is replaced with {"0001"}, which results in the following HExpr:

{(f1, {"0001"}), (f3, {"0001", "00x0"})}

Subsequently, the field "f2" may be rewritten to {"1111"}, resulting in:

{(f1, {"0000"}), (f2, {"1111"}), (f3, {"0001", "00x0"})}

Lastly, the field "f3" may be rewritten to "xxxx". Because "f3" is written to be a fully wildcarded value, the resulting fully rewritten HExpr is:

{(f1, {"0000"})}

Rewriting a field in an HExpr may involve changing at least the value of the minuend of the HExpr, which is described in greater detail further in the present application. In various embodiments, the rewrite operation may be performed in cases that are more complex where HExprs that are being rewritten have subtrahends. Multiple-field rewrites may be considered as a sequence of single-field rewrite actions.

HExpr transformations may also be expressed as a move action. A move action moves the values of a field to another field. To illustrate, there may be the following HExpr:

{(f1, {"0000"}), (f3, {"0001", "00x0"})}

Moving the value of "f1" to "f4" may result in the following HExpr:

{(f3, {"0001", "00x0"}), (f4, {"0000"})}

Moving the value of a field to another HExpr is described in greater detail further in the present application, including how the operation is executed in the presence of subtrahends.

In another embodiment of the present application, another operation that the network modeling system may perform on packets includes intersecting two HExprs. Intersecting HExprs may be a required operation for tracing packet collections through rule tables. To complete such an intersection requires the ability to intersect HSeqs, which requires the ability to intersect HBits.

The following table may be used to intersect two HBit values:

| Bit 1 | Bit 2 | Result |
| --- | --- | --- |
| 0 | 0 | 0 |
| 0 | 1 | empty |
| 1 | 0 | empty |
| 1 | 1 | 1 |
| x | 0 | 0 |
| 0 | x | 0 |
| x | 1 | 1 |
| 1 | x | 1 |
| x | x | x |

According to various embodiments in modeling packet collections, another operation that the network modeling system may perform on packets is intersecting two header sequences ("HSeqs"), where an HSeq is a sequence of HBits. Two HSeqs may be combined if and only if they have the same number of bits. Corresponding bits at each position are intersected and the result is placed in that position in the resulting HSeq. If the intersection of two HBits in the same position is empty, the two HSeqs also have an empty intersection. To illustrate, examples of intersecting two HBits are outlined below:

| HSeq 1 | HSeq 2 | Intersection Result |
| --- | --- | --- |
| xxxx | 0000 | 0000 |
| 0x00 | x100 | 0100 |
| 0000 | 1111 | empty |

According to another embodiment in modeling packet collections, another operation that the networking modeling system may perform on packets is intersecting two header sequence collections ("HSeqCollections"), where an HSeqCollection is a collection of HSeqs. For each HSeq pair (s1, s2) where s1 belongs to the first HSeqCollection and s2 belongs to the second HSeqCollection, the intersection of s1 and s2 is computed as disclosed using the same technique for intersecting two HSeqs. If the result of this intersection is nonempty, then it is added to the resulting HSeqCollection.

To illustrate, there may be two HSeqCollections, as shown below:
c1={s11, s12}
c2={s21, s22}

In the above examples of the two HSeqCollections, s11, s12, s21, and s22 may represent different HSeqs. To intersect these two HSeqCollections, the intersections of all possible pairs of HSeqs are considered below:
{s11∩s21, s11∩s22, s12∩s21, s12∩s22}

If the result of each pair's intersection is nonempty, it may be added to the resulting HSeqCollection.

Another operation that the network modeling system may perform on packets according for various embodiments includes intersection two header regions ("HRegions"), where an HRegion is a map from packet fields to HSeqCollections. If a packet field is fully wildcarded in an HRegion, it may not have an entry in the corresponding map. Intersecting two HRegions may performed by intersecting the corresponding HSeqCollection values of each field. If a packet field is fully wildcarded in only one of the HRegions, then its value in the intersection result may come from the value in the other HRegion. If it is not fully wildcarded in both the HRegions, its value in the intersection result may be the intersection of the HSeqCollection values in the two HRegions computed using the method explained in the "Intersection of two HSeqCollections" section. If this intersection of the HSeqCollections is empty, the intersection result of the two HRegions may also be empty.

In another embodiment, another operation that the network modeling system may perform on packets includes intersecting an HExpr and an HRegion. The result of intersecting an HExpr with an HRegion may be another HExpr. This operation may be invoked when tracing the group of packets that can enter each rule in a rule table. To intersect HExpr 'hs' with HRegion 'r', first the minuend of 'hs' is intersected with 'r' using the same technique disclosed to intersect two HRegions. The result of this intersection of 'hs' and 'r', HRegion 'n', may then become the minuend of the result. If 'n' is empty, the result of intersecting 'hs' and 'r' may also be empty; otherwise, each of the subtrahends of 'hs' may be intersected with 'n', again using the technique for intersecting two HRegions.

For each of these intersections, the following cases may apply. If the result is empty, the subtrahend may be ignored such that it is not included in the resulting HExpr. If the result is equal to 'n', then this subtrahend is subtracting all of 'n' from the result, and the resulting HExpr is empty. In this case, the result of intersecting 'hs' and 'r' is empty, and no other subtrahends need to be processed; otherwise, the result is added as a subtrahend of the resulting HExpr.

In another embodiment, the network modeling system may perform another operation on packets including intersecting two HExprs. To intersect two HExprs, 'hs1' and 'hs2', the intersection of their minuends is first computed using the technique for intersecting two HRegions, and the result may be referred to as 'm'. If that intersection is empty, the final intersection result may also empty. Otherwise, for each of the subtrahends of 'hs1' and 'hs2', the intersection of that subtrahend with 'm' may be computed. If the result is empty, that subtrahend may be discarded. If the result equals 'm', then that subtrahend is subtracting all the data points in the minuend and the result of the intersection of the two HExpr becomes empty. The result in an HExpr with 'm' as its minuend and subtrahends computed using the above procedure.

Additionally, according to various embodiments, another operation that the network modeling system may perform on packets includes subtrahend simplification operations with HExprs. In the sections below, the term 'combination' may refer to applying a union operation, then attempting to simplify the result. The combination operation helps to speed up computation, by transforming the set of subtrahends of an HExpr to another set with fewer subtrahends, which represents the exact same collection of packets. Given that the number of subtrahends is reduced, operations that are performed on this HExpr may be computed faster.

Sometimes a combination of subtrahends results in a single subtrahend, which is equal to the minuend. In cases like this, every packet represented by the minuend may be excluded by that subtrahend and as a result, this HExpr represents an empty set. Combining subtrahends in this case can help to identify empty packet collections and any tracing operation on that group of packets can stop early. A related operation, subtrahend dropping, also helps to speed up computation and reduce memory requirements, when an HExpr containing one or more subtrahends can be represented with fewer subtrahends, and possibly none. These two subtrahend simplification operations are applied whenever we create a new HExpr, such as when tracing a collection of packets through a rule table.

When an HExpr has multiple subtrahends, it is possible that if those subtrahends are combined, the combination becomes equal to the minuend. In this case, the HExpr is empty and does not match any packet. To illustrate combining subtrahends, there may be the following HExpr:
Minuend={(f1, {"000x"})}
Subtrahend 1={(f1, {"0000"})}
Subtrahend 2={(f1, {"0001"})}

In this example, the two subtrahends may be reduced to {(f1, {"000x"})} which is equal to the minuend and indicates that the HExpr is empty. An empty HExpr indicates no packet can match it and given that the network model describes how packets are transferred in the network, the network modeling system may detect empty HExprs to determine when to stop. As such, whenever a new HExpr is created, its subtrahends may be combined as much as possible, using a technique for combining two HRegions, described below, and then check if any of the combined subtrahends is equal to the minuend.

However, the combination does not necessarily result in unique outputs. In an illustrative example, consider the following three subtrahends:
Subtrahend 1={(f1, {"0000"})}
Subtrahend 2={(f1, {"0001"})}
Subtrahend 3={(f1, {"0010"})}

Subtrahends 1 and 2 may be combined. Similarly, subtrahends 1 and 3 may be combined. However, subtrahends 2 and 3 cannot be combined. If subtrahends 1 and 2 are combined the following results:
Subtrahend a={(f1, {"000x"})}
Subtrahend b={(f1, {"0010"})}

Alternatively, if subtrahends 1 and 3 are combined, the result is:
Subtrahend c={(f1, {"00x0"})}
Subtrahend d={(f1, {"0001"})}

All of the above collections of subtrahends represent the same collection of packets. According to various embodiments, the network models do not rely on equivalent representations for HExprs and only needs to combine subtrahends to detect empty HExprs. Hence, non-unique results of combinations do not affect correctness, as all results describe an identical collection of packets.

When a subtrahend differs from its minuend in only a single field and the values in the minuend that are not subtracted by that subtrahend can be represented by an HSeqCollection, subtrahends may be dropped. In dropping subtrahends, that subtrahend is removed and the minuend value is pruned. For example, consider an HExpr where the minuend is '{(f1, {"000x"})}' and the subtrahend is '{(f1, {"0000"})}'. In this case, we can drop the subtrahend and update minuend to '{(f1, {"0001"})}' because "000x" minus "0000" can be expressed as an HSeqCollection, namely "0001".

HSeqs may also be combined in another operation that the network modeling system may perform on packets. According to various embodiments, HSeq values may be combined as much as possible to achieve a more compact and hence more efficient representation of the same packet collection. Two HSeqs may be combined in different cases, such as when (1) the values are equal; (2) one of the values subsumes the other (e.g. '00xx' subsumes '0000'); or (3) they differ in only one bit position (e.g. '0000' and '0001' differ in a single bit position and can be combined to '000x'). When combining more than two HSeq values, instead of pairwise combinations, alternative data structures like a trie can be used for a more efficient computation of the final result.

A combination of two HSeqCollections may also be invoked by first creating the union of all the values in these two collections, putting them into a set. Then, for each pair of HSeqs in this set, the two HSeqs may be combined according to various embodiments. If the two HSeqs can be combined into one, the two values may be removed from the union and instead added to their combination. Embodiments of the present application include continuing this process until no more combination is possible. To illustrate, consider the following to HSeqCollections:
c1={"0001", "00x0"}
c2={"0010", "1000"}
   The union of the values is:
   {"0001", "00x0", "0010", "1000"}
   However, in this union the 2nd and 3rd values may be combined by combining two HSeqs according to various embodiments. In this specific case, the 2nd value subsumes the 3rd value. As such, the resulting union is:
   {"0001", "00x0", "1000" }
   As mentioned, according to various embodiments, another operation that the network modeling system may perform on packets includes the combination of two HRegions. Two HRegions may be combined only if they differ in values of at most one field. For example, consider the following two regions:
r1={(f1, {"0000"}), (f3, {"0000"})}
r2={(f1, {"0000"}), (f3, {"0001", "1000"})}
   These two regions only differ in values of the field f3 and may be combined to the following single region:
   combined={(f1, {"0000"}), (f3, {"000x", "1000"})}
   Combining the two HRegions may be performed using the technique described for combining two HSeqCollections to combine the HSeqCollection values corresponding to the single field in which the two HRegions differ, and then copying over the values corresponding to the other fields.

According to another embodiment, subtracting an HRegion from an HExpr may also be an operation performed on a packet collection by the network modeling system. First, the provided HRegion is intersected with the minuend of the HExpr. The resulting HRegion may be the actual region to be subtracted from the provided HExpr. This region may be added as a new subtrahend. However, in subtrahend simplification operations with HExprs, the HRegion may first be combined with other subtrahends before adding it as a new subtrahend. If after the combination, any of the subtrahends becomes equal to the minuend, then the result HExpr may be empty. As an illustrative example, consider the following HExpr:
Minuend={(f1, {"000x"})}
Subtrahend 1={(f1, {"0000"})}
   Subtracting {(f1, {"0010"})} the HRegion from the HExpr results in the following (i.e., the HRegion is simply added as a new subtrahend):
Minuend={(f1, {"000x"})}
Subtrahend 1={(f1, {"0000"})}
Subtrahend 2={(f1, {"0010"})}
   However, subtracting (f1, {"0001"}) from the HExpr, results in an empty HExpr, as illustrated below:
Minuend={(f1, {"000x"})}
Subtrahend 1={(f1, {"0000"})}
Subtrahend 2={(f1, {"0001"})}
   The two subtrahends may be combined to form:
Minuend={(f1, {"000x"})}
Subtrahend 1={(f1, {"000x"})}
   Subsequently in this case, there is an HExpr where one of the subtrahends is equal to minuend. Hence, all possible packets are excluded from the minuend and nothing is left.

In rewriting a field in an HRegion, the value of the field may be simply changed to a new value. For example, rewriting the value of the field f1 to the HSeqCollection {"0000"} in the HRegion
   {(f1, {"0001", "0010"}), (f3, {"0000"})}
   results in the HRegion
   {(f1, {"0000"}), (f3, {"0000"})}.
   A field in an HExpr may also be rewritten in another operation that the network modeling system may perform on a packet. For rewriting field 'f' in an HExpr, first, the minuend of the HExpr is rewritten using the technique to rewrite a field of an HRegion. This minuend rewrite step may apply to various embodiments, which vary in the number and form of subtrahends. For example, if the HExpr only contains a minuend, then the rewrite of the field is complete. Alternatively, there may be cases where subtrahends are present.

The first case is where the value of field f1, the field to be rewritten, is the same between the minuend and each subtrahend. In this case, the value may be rewritten for field f1 in each subtrahend. To illustrate, consider this HExpr:
Minuend={(f1, {a, b})}
Subtrahend 1={(f1, {a, b}), (f2, {z})}
   The minuend contains multiple values for field f1, a and b. An alternate representation would be to generate one HExpr for each value of field f1 and union them together, as illustrated below:
Minuend={(f1, {a})}
Subtrahend 1={(f1, {a, b}), (f2, {z})}
∪
Minuend={(f1, {b})}
Subtrahend 1={(f1, {a, b}), (f2, {z})}
   In each HExpr, there is a subtrahend value, which has no intersection with the minuend. In these cases, that non-intersecting subtrahend value may be removed. Hence, the expression may be reduced to the following:
Minuend={(f1, {a})}
Subtrahend 1={(f1, {a}), (f2, {z})}
∪
Minuend={(f1, {b})}
Subtrahend 1={(f1, {b}), (f2, {z})}

The result of rewriting field f1 to value d may be illustrated by:
Minuend={(f1, {d})}
Subtrahend 1={(f1, {d}), (f2, {z})}
∪
Minuend={(f1, {d})}
Subtrahend 1={(f1, {d}), (f2, {z})}

This result may be simplified to a single HExpr, since both parts of the union are identical, as illustrated below:
Minuend={(f1, {d})}
Subtrahend 1={(f1, {d}), (f2, {z})}

As illustrated above, in this example, each field value of f1 may be replaced with d, even when there are multiple field values. However, in examples where the field values differ, handling these cases requires more care.

In another embodiment, consider another example where the values for field f1 (to be rewritten) are different between the minuend and one subtrahend. To illustrate, consider this HExpr example:
Minuend={(f1, {a, b})}
Subtrahend 1={(f1, {a}), (f2, {z})}

The alternate representation for this HExpr may be illustrated by:
Minuend={(f1, {a})}
Subtrahend 1={(f1, {a}), (f2, {z})}
∪
Minuend={(f1, {b})}
Subtrahend 1={(f1, {a}), (f2, {z})}

For the second HExpr, subtrahend 1 may be removed, because it has no intersection with the minuend, yielding the following:
Minuend={(f1, {a})}
Subtrahend 1={(f1, {a}), (f2, {z})}
∪
Minuend={(f1, {b})}

The result of rewriting field f1 to d becomes:
Minuend={(f1, {d})}
Subtrahend 1={(f1, {d}), (f2, {z})}
∪
Minuend={(f1, {d})}

In this case, the second HExpr subsumes the first, yielding:
Minuend={(f1, {d})}

In this example, if the value of field f1 (i.e., the field to be rewritten) on a single subtrahend is different from the value of that field on the minuend, then the subtrahend can be discarded when performing the rewrite.

In a third case, there may be more complexity where an HExpr contains two or more subtrahends, and each subtrahend has a value for field f1 that is different from the minuend. The challenge is that each subtrahend removes a piece of the minuend, but the intersection of the non-removed pieces must be accounted for. To illustrate, consider this HExpr:
Minuend={(f1, {a, b})}
Subtrahend 1={(f1, {a}), (f2, {z})}
Subtrahend 2={(f1, {b}), (f3, {w})}

Putting this into the alternate union form yields the following:
Minuend={(f1, {a})}
Subtrahend 1={(f1, {a}), (f2, {z})}
Subtrahend 2={(f1, {b}), (f3, {w})}
∪
Minuend={(f1, {b})}
Subtrahend 1={(f1, {a}), (f2, {z})}
Subtrahend 2={(f1, {b}), (f3, {w})}

Where subtrahends have no intersection with the minuend value for field f1, they can be removed. Each HExpr contains one such removable subtrahend. The result is the following:
Minuend={(f1, {a})}
Subtrahend 1={(f1, {a}), (f2, {z})}
∪
Minuend={(f1, {b})}
Subtrahend 2={(f1, {b}), (f3, {w})}

Now the value of field f1 may be rewritten with d:
Minuend={(f1, {d})}
Subtrahend 1={(f1, {d}), (f2, {z})}
∪
Minuend={(f1, {d})}
Subtrahend 2={(f1, {d}), (f3, {w})}

However, these two remaining subtrahends may not be simply directly combined into a single HExpr, even though their minuends are the same, because there is an intersecting piece that remains. As such, the correct single HExpr form of the union-form HExpr above is:
Minuend={(f1, {d})}
Subtrahend 1={(f1, {d}), (f2, {z}), (f3, {w})}

This new subtrahend removes the piece of the minuend, which is shared between the two subtrahends in the union-form HExpr above. According to various embodiments, the network modeling system may automatically compute this singular resulting subtrahend, for HExprs with any number of subtrahends. Each subtrahend that has a different value for field f1 than the minuend may serve as an input in the computation.

For each pair of such subtrahends, a new subtrahend may be generated. In this new subtrahend, the value for field 'f1' is the combination of the values in the two original subtrahends, where the combination is computed by the technique describe for combining HSeqCollections. The value for each other field is computed from the intersection of the corresponding field values in the two original subtrahends. If the intersection of each non-'f1' field is non-empty, then this subtrahend is to be added, and moves to the next step. However, if the intersection is empty, then no subtrahend is added to the pending HExpr.

According to various embodiments, with a list of "intermediate" subtrahends, the process may be repeated. For example, merging pairs of remaining subtrahends, until either the newly merged pair has the same value for field f1 as the minuend, or the list of subtrahends cannot be further reduced. To illustrate, consider the following example HExpr:
Minuend={(f1, {"0001", "0010", "0100"})}
Subtrahend 1={(f1, {"0001"}), (f2, {"0001", "0010"})}
Subtrahend 2={(f1, {"0001", "0010", "0100"}), (f2, {"1000"})}
Subtrahend 3={(f1, {"0100"}), (f2, {"0001", "0100"})}
Subtrahend 4={(f1, {"0010"}), (f2, {"0001", "0010", "0100"})}

The value of 'f1' may be rewritten to "1000". First, the minuend may be written as:
New Minuend={(f1, {"1000"})}

From the collection of subtrahends, only subtrahend 2 has the same value as the original minuend on 'f1'. Subsequently, that subtrahend may be added after rewriting its 'f1' field. Three subtrahends where the value of field 'f1' differs from the minuend remain. New subtrahends may be added based on each possible pair of values in this set of remaining subtrahends. For each new potential subtrahend, the 'f1' field value comes from the combination of the two input 'f1' values and the value for each non-'f1' field comes from the intersection of the two input non-'f1' values. To illustrate, consider the following example:
Subtrahends (1, 3)={(f1, {"0001", "0100"}), (f2, {"0001"})}
Subtrahends (1, 4)={(f1, {"0001", "0010"}), (f2, {"0001", "0010"})}
Subtrahends (3, 4)={(f1, {"0010", "0100"}), (f2, {"0001", "0100"})}

None of these new potential subtrahends has the same value as the original minuend for f1. However, they can still be further merged. Merging subtrahend pairs (1, 3) and (1, 4) yields the following:
Subtrahends (1, 3)+(1, 4)={(f1, {"0001", "0010", "0100"}), (f2, {"0001"})}
Subtrahends (3, 4)={(f1, {"0010", "0100"}), (f2, {"0001", "0100"})}

Merging these two subtrahends yields a single subtrahend below:
Subtrahends (1, 3)+(1, 4)+(3, 4)={(f1, {"0001", "0010", "0100"}), (f2, {"0001"})}

This simplified subtrahend can now be added. The resulting HExpr contains the following two subtrahends:
Subtrahend 1={(f1, {"0001", "0010", "0100"}), (f2, {"1000"})}
Subtrahend 2={(f1, {"0001", "0010", "0100"}), (f2, {"0001"})}

These two subtrahends can be combined using the technique described in subtrahend simplification operations with HExprs, yielding a single subtrahend:
Subtrahend={(f1, {"0001", "0010", "0100"}), (f2, {"0001", "1000"})}

Then field f1 may be rewritten, yielding a "final" HExpr of:
Minuend={(f1, {"1000"})}
Subtrahend={(f1, {"1000"}), (f2, {"0001", "1000"})}

Another action that may be performed on packets according to various embodiments may include moving the value of a field to another field in an HRegion. Given a pair of source and target fields, this action moves the value of the source field to the target field. This operation is equivalent to rewriting the source field with the fully wildcarded HSeqCollection and rewriting the target field with the old value of the source field. To illustrate, consider the following HRegion:
{(f1, {"0001", "0010"}), (f3, {"0000"})}.
Moving the value of f1 to f2 results in the following:
{(f2, {"0001", "0010"}), (f3, {"0000"})}.
Moving the value of f1 to f3 results in the following:
{(f3, {"0001", "0010"})}.

Another action that may be performed on packets according to various embodiments may include moving the value of a field to another field in an HExpr. To move value of field 's' to field 't' in HExpr 'hs', first value of field 's' may be moved to field 't' in the minuend of 'hs' using the technique described for moving the value of a field to another field in an HRegion. The resulting HRegion is the minuend of the result HExpr. This shift may be similarly performed on each of the subtrahends of 'hs' to compute the subtrahends of the result HExpr. However, some of the subtrahends should be discarded as part of this operation. To illustrate, consider the following HExpr:
Minuend={(f2, {"10xx"})}
Subtrahend 1={(f1, {"0001"})}
Subtrahend 2={(f2, {"0000"})}

When moving the value of field f2 to field f1, the first subtrahend should be discarded, because it has been subtracting a region from minuend, which is not being rewritten to a new value. The second subtrahend may not have an entry for the target field (f1) and should be retained in the final result. We just need to move its value. This procedure results in the following HExpr:
Minuend={(f1, {"10xx"})}
Subtrahend={(f1, {"0000"})}

The representation may be implemented in Java, C++, C #, or any suitable programming language, on any computing hardware, such as a general-purpose processor or graphics processor. In some embodiments, the invention may be implemented directly in hardware, via field-programmable gate array or application-specific integrated circuit.

Embodiments of the present invention provide a system and method to detect rules within the same or different tables that have overlapping match fields, and present this to the user. Additionally, the network modeling system may be enabled to detect rules within the same or different tables related to a given input rule such that packets matching them will also be matched by the given rule. Rules may also be detected within the same or different tables that are ambiguous due to having the same matching priority, and some or full overlap in match fields.

Embodiments of the present invention provide a system and method to analyze rules and the network more generally, and provide suggestions for optimization, such as the elimination of rules, modification to rules, or addition of other rules. Furthermore, the networking modeling system according to various embodiment may provide suggestions to the user on how to fix them. These problems include those detected by network checks, queries, or other performance, optimization, or correctness related problems. The invention may also automatically apply changes to fix such problems.

Figure 8:
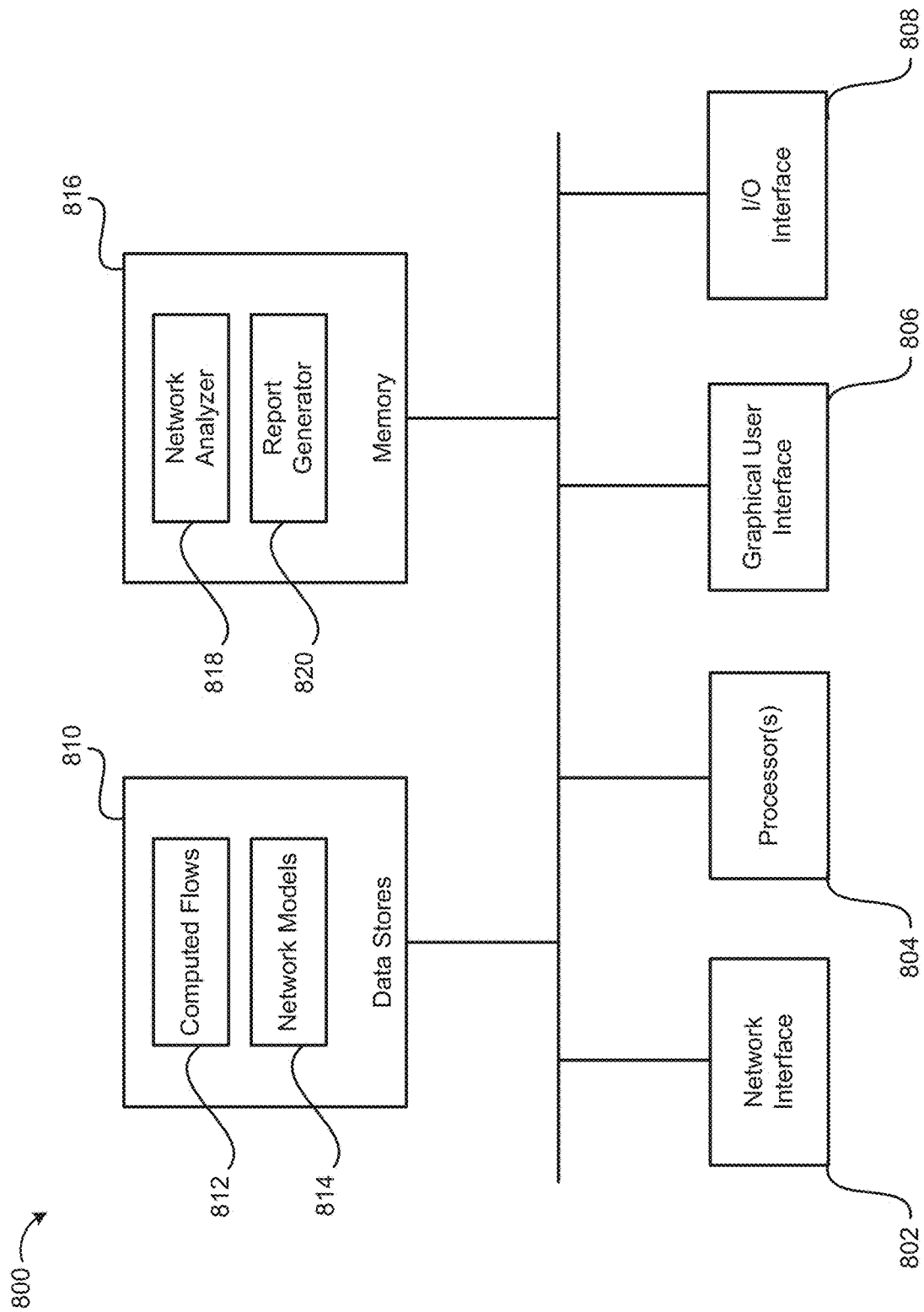
FIG. 8 is a high-level block diagram illustrating a computer system, in accordance with an embodiment of the present invention.

FIG. 8 is a high-level block diagram 800 of a computer system, in accordance with an embodiment of the present invention. As shown in FIG. 8, a computer system can include hardware elements connected via a bus, including a network interface 802, that enables the computer system to connect to other computer systems over a local area network (LAN), wide area network (WAN), mobile network (e.g., EDGE, 3G, 4G, or other mobile network), or other network. The computer system can further include one or more processors 804, such as a central processing unit (CPU), field programmable gate array (FPGA), application-specific integrated circuit (ASIC), network processor, or other processor. Processors may include single or multi-core processors.

In some embodiments, the computer system can include a graphical user interface (GUI) 806. GUI 806 can connect to a display (LED, LCD, tablet, touch screen, or other display) to output user viewable data. In some embodiments, GUI 806 can be configured to receive instructions (e.g., through a touch screen or other interactive interface). In some embodiments, I/O interface 808 can be used to connect to one or more input and/or output devices such as mice, keyboards, touch-sensitive input devices, and other input or output devices. I/O interface 808 can include a wired or wireless interface for connecting to infrared, Bluetooth, or other wireless devices.

In some embodiments, the computer system may include local or remote data stores 810. Data stores 810 can include various computer readable storage media, storage systems, and storage services, as are known in the art (e.g., disk drives, CD-ROM, digital versatile disk (DVD) or other optical storage, magnetic cassettes, magnetic tape, magnetic disk storage or other magnetic storage devices, relational databases, object storage systems, local or cloud-based storage services, or any other storage medium, system, or service). Data stores 810 can include data generated, stored, or otherwise utilized as described herein. For example, data stores 810 can include computed flows 812 and network models 814, generated and stored as described above. Memory 816 can include various memory technologies, including RAM, ROM, EEPROM, flash memory or other memory technology. Memory 816 can include executable code to implement methods as described herein. For example, memory 816 can include a network analyzer module 818 and report generator module 820 that each implement methods described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A computer-implemented method for modeling networks, comprising:
    obtaining network behavior information associated with a plurality of network devices in a network;
    generating a network model based on the network behavior information, wherein the network model includes a plurality of network device representations based on the plurality of network devices, individual representations having at least one rule table including a list of rules, individual rules in the list of rules including a match specifier and one or more corresponding actions, wherein the match specifier identifies matching packets to which the at least one rule applies, and wherein individual of the actions is at least one of packet modification and packet forwarding;
    identifying a plurality of packets to analyze, using the network model, each packet of the plurality of packets including packet header values;
    creating a virtual packet header representing the plurality of packets, the virtual packet header including one or more packet header groups, individuals of the one or more packet header groups representing a union of two or more packet header values individual packet header values represented as wildcard bit strings;
    providing the virtual packet header to a first network device representation, the first network device representation including at least a first rule having a corresponding match specifier comprising at least two match criteria and one or more corresponding actions, wherein at least one of the corresponding actions includes forwarding behavior for packets satisfying the at least two match criteria;
    determining a subset of the packets that satisfies the first match criteria;
    determining a second subset of the subset that satisfies the second match criteria;
    forwarding the second subset to a second network device representation;
    determining one or more flow paths defining the traffic flow of the network based at least on the forwarding of the second subset; and
    updating the network behavior information based on the one or more flow paths.

2. The computer-implemented method of claim 1, wherein at least one of the one or more packet header groups of the virtual packet header includes at least one packet header value that is unspecified.

3. The computer-implemented method of claim 1, wherein at least one packet header group in the virtual packet header represents a group of two or more packet header values with one or more wildcard bit strings, wherein at least one wildcard bit represents both a 0 and a 1 in a particular bit position in the two or more packet header values.

4. The computer-implemented method of claim 1, wherein the virtual packet header is represented as a difference between a first virtual packet header and one or more other virtual packet headers, the first virtual packet header representing a first group of packets, and the one or more other virtual packet headers representing additional groups of packets.

5. The computer-implemented method of claim 1, wherein determining the one or more flow paths further comprises performing a transformation operation on the virtual packet header, wherein the transformation operation changes at least one packet header value.

6. The computer-implemented method of claim 5, wherein the transformation operation includes one or more of a rewrite operation, a combination operation, a move operation, a shift operation, an intersection operation, and a reduction operation.

7. The computer-implemented method of claim 4, further comprising:
    modifying at least one of the first virtual packet header and one of the other virtual packet headers computed as a result of a transformation operation, wherein the transformation operation changes at least one packet header value; and
    reducing the result of the transformation operation, wherein the result of the operation generates a different virtual packet header representing an equivalent group of packets.

8. The computer-implemented method of claim 1, wherein the network device behavior is inferred based at least in part on control-plane configuration data.

9. The computer-implemented method of claim 1, wherein the one or more corresponding actions for matching packets includes at least one of: applying transformations to packets, dropping packets, forwarding packets to a subsequent rule, forwarding packets to a subsequent rule table, forwarding packets to a subsequent network device in the network, forwarding packets out of one or more ports, and forwarding packets to another device out of the network.

10. A non-transitory computer readable medium storing code executable by a processor to implement a method, the method comprising:
    obtaining network behavior information associated with a plurality of devices in a network;
    generating a network model based on the network behavior information, wherein the network behavior information includes representations of the plurality of devices, individuals of the representations including at least one rule table having a list of rules, individuals of the rules including a match specifier and forwarding behavior for packets that match the respective match specifier;
    creating a virtual packet header representing a plurality of packets, the virtual packet header including one or more packet header groups, at least one of the one or more packet header groups representing a union of two or more packet header values represented as wildcard bit strings;
    providing the virtual packet header to a first network device representation, the first network device representation including at least a first rule having a corresponding match specifier comprising at least two match criteria and forwarding behavior for packets satisfying the at least two match criteria;
determining a subset of the packets that satisfies the first match criteria;
determining a second subset of the subset that satisfies the second match criteria;
determining one or more flow paths defining a traffic flow based at least in part on the forwarding behavior associated with the first rule and the second subset; and
updating the network behavior information based on the one or more flow paths.

11. The non-transitory computer readable medium of claim 10, wherein the network behavior information includes at least one rule table, the at least one rule table including at least one rule defining a flow path of the packet or the collections of packets within the traffic flow of the network, and wherein at least one rule in the at least one rule table is implicit or explicit, and each of the at least one rule tables is implicit or explicit, and at least one rule table contains an ordered or unordered list of rules.

12. The non-transitory computer readable medium of claim 10, wherein the virtual packet header is represented as a difference between a first virtual packet header and one or more other virtual packet headers, the first virtual packet header representing a first group of packets, and the one or more other virtual packet headers representing additional groups of packets.

13. The non-transitory computer readable medium of claim 10, wherein the analysis operations include a transformation operation on the virtual packet header, wherein the transformation operation changes at least one packet header value of the one or more collections of packets.

14. The non-transitory computer readable medium of claim 10, wherein at least one of the one or more packet header groups of the virtual packet header includes at least one packet header value that is unspecified.

15. The non-transitory computer readable medium of claim 10, wherein at least one packet header group in the virtual packet header represents a group of two or more packet header values with one or more wildcard bit strings, wherein at least one wildcard bit represents both a 0 and a 1 in a particular bit position in the two or more packet header values.

16. A system, comprising:
one or more processors; and
one or more memory devices including instructions that, when executed by the one or more processors, cause the system to:
obtain network behavior information associated with a plurality of devices in a network;
generate a network model based on the network behavior information, wherein the network behavior information includes representations of the plurality of devices, individuals of the representations including at least one rule table having a list of rules, individuals of the rules including a match specifier and forwarding behavior for packets that match the respective match specifier;
create a virtual packet header representing a plurality of packets, the virtual packet header including one or more packet header groups, at least one of the one or more packet header groups representing a union of two or more packet header values represented as wildcard bit strings;
provide the virtual packet header to a first network device representation, the first network device representation including at least a first rule having a corresponding match specifier comprising at least two match criteria and forwarding behavior for packets satisfying the at least two match criteria;
determine a subset of the packets that satisfies the first match criteria;
determine a second subset of the subset that satisfies the second match criteria;
determine one or more flow paths defining a traffic flow based at least in part on the forwarding behavior associated with the first rule and the second subset; and
update the network behavior information based on the one or more flow paths.

17. The system of claim 16, wherein the virtual packet header is represented as a difference between a first virtual packet header and one or more other virtual packet headers, the first virtual packet header representing a first group of packets, and the one or more other virtual packet headers representing additional groups of packets.

18. The system of claim 16, wherein the analysis operations include a transformation operation on the virtual packet header, wherein the transformation operation changes at least one packet header value of the one or more collections of packets.

19. The system of claim 16, wherein at least one of the one or more packet header groups of the virtual packet header includes at least one packet header value that is unspecified.

20. The system of claim 16, wherein at least one packet header group in the virtual packet header represents a group of two or more packet header values with one or more wildcard bit strings, wherein at least one wildcard bit represents both a 0 and a 1 in a particular bit position in the two or more packet header values.

* * * * *